Jan. 24, 1939.  R. L. BELL  2,144,957
AUTOMATIC ELECTRICAL SWITCH
Filed March 6, 1937  2 Sheets-Sheet 1
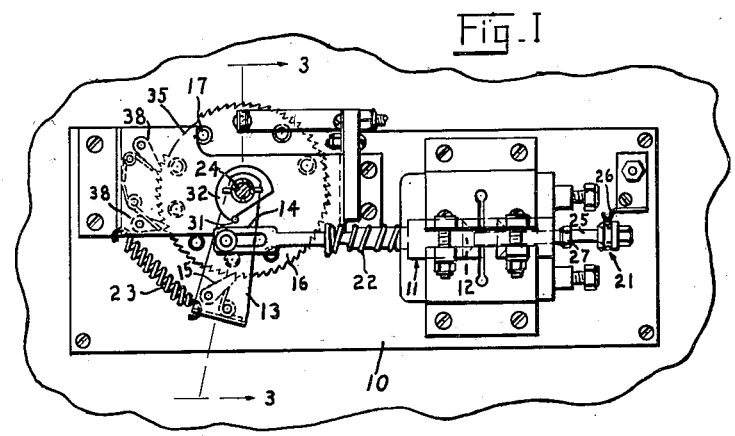
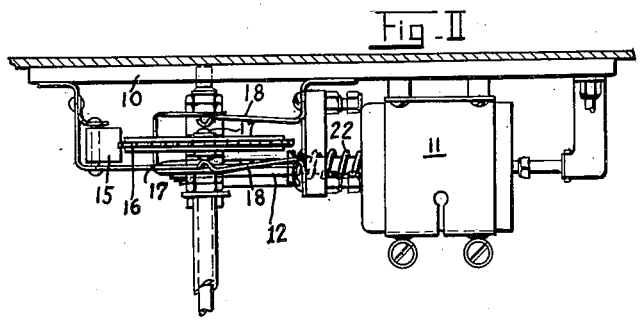
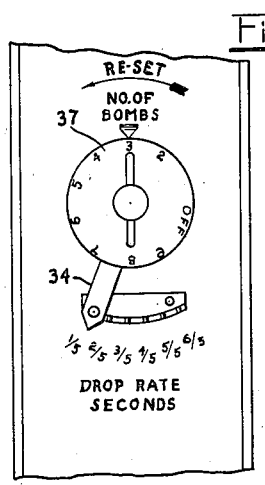
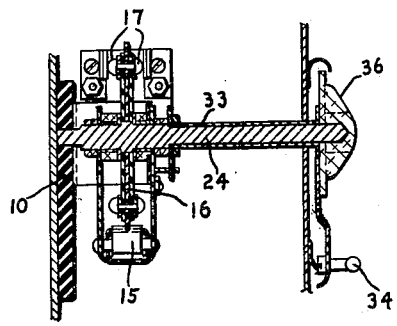
INVENTOR.
RALPH L. BELL
BY
ATTORNEY.

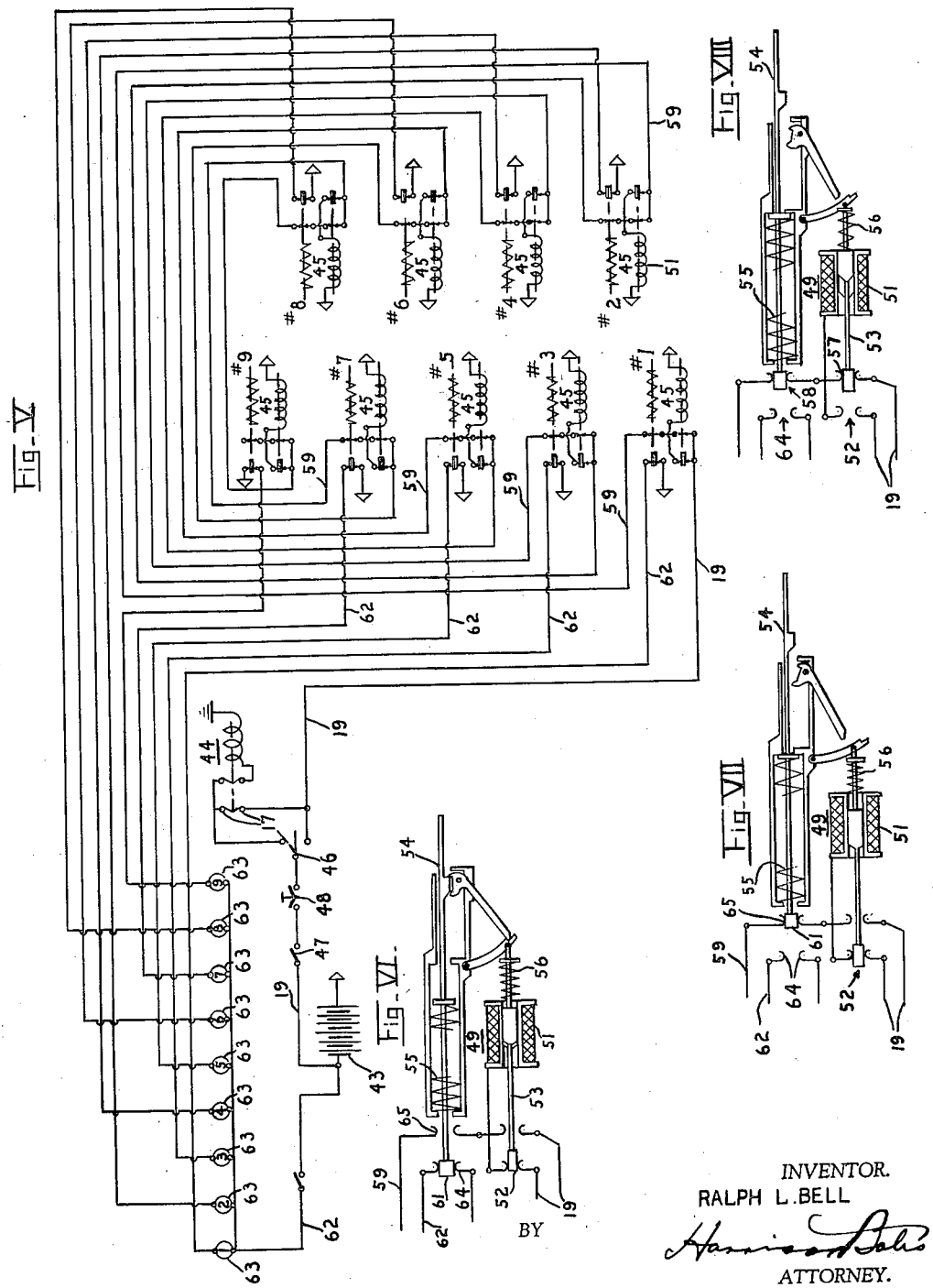

Patented Jan. 24, 1939

2,144,957

UNITED STATES PATENT OFFICE 2,144,957

AUTOMATIC ELECTRICAL SWITCH

Ralph L. Bell, Raspeburg, Md., assignor to The Glenn L. Martin Company, Baltimore, Md.

Application March 6, 1937, Serial No. 129,330

5 Claims. (Cl. 89—1.5)

This invention relates to an electrical device and more particularly to a novel mechanism for controlling intermittently the opening and closing of an electrical circuit at predetermined intervals. The present device is particularly, but not necessarily, adapted for releasing bombs from an airplane at predetermined intervals. It has been the general custom for a pilot or operator to actuate a mechanism for releasing bombs and the intervals between the releasing of such bombs are dependent upon more or less guesswork by the operator. In view of the high velocity of bombing aircraft, the time element between the dropping of the bombs is a very important factor to the accuracy of the bombing operation. Therefore, a fraction of a second would result in the bomb missing its mark by a considerable distance, dependent upon, among other things, the velocity or speed of the aircraft.

It is one object of this invention to provide an electrical device for automatically releasing bombs from an aircraft.

Another object is to provide a novel device for releasing bombs from an aircraft at predetermined intervals.

Another object is to provide a novel device for opening and closing an electrical circuit a predetermined number of times that shall be adjustable for varying the time interval between such opening and closing of such circuit.

Another object is to provide a novel device for predetermining the number of times which an electrical circuit will be opened and closed and the time element between the opening and closing of such circuit, which time element can be varied independently of the number of times the circuit is to be opened or closed.

Another object is to provide a time control device that shall operate efficiently without the use of balance wheels, springs, and escapement devices.

Another object is to provide an electrical device having the above characteristics that shall also indicate to the operator the number and location of bombs carried by the aircraft.

A further object is to provide an electrical device having the above characteristics that shall operate to simultaneously release bombs from an aircraft and operate a signal device for indicating to the operator the particular location from which the bomb is released from the aircraft.

A still further object is to provide an electrical device having the above characteristics that shall be rugged, positive and effective in operation, simple in construction, and comparatively light in weight.

The above and other objects will be made apparent throughout the further description of the invention when taken in connection with the accompanying drawings, wherein like reference characters refer to like parts. It is to be distinctly understood that the drawings are not a definition of the invention but merely illustrate certain forms by means of which the invention may be effectuated. It is expressly pointed out here that while the preferred form of the invention is disclosed in connection with the automatic dropping of bombs from aircraft that the present device is equally adaptable wherever an automatic intermittent control of an electrical circuit is desired, such as automatic signaling devices, automatic counting devices, remote controls or electrical devices, automatic gun firing, automatic marine sounding, or automatic telephoning or radio operated devices, or the like.

In the drawings:

Figure I is an elevational view partly in section illustrating a device embodying the invention shown mounted within an airplane fuselage and on the side wall thereof.

Figure II is a top plan view of Figure I.

Figure III is a sectional view taken along the line 3—3 of Figure I.

Figure IV is a fragmentary view showing the indicating and control mechanism embodying the invention.

Figure V is a wiring diagram embodying the invention, and

Figures VI, VII, and VIII are diagrammatic views of a switch mechanism embodying the invention showing the switch mechanism in different positions.

Referring to the drawings, Figures I to IV, inclusive, illustrate one form of an electrical control device for automatically opening and closing an electrical circuit.

The mechanism consists of a supporting base 10 having mounted thereon a solenoid represented in its entirety by 11 adapted to actuate a plunger 12. The plunger 12 is operably connected to a ratchet lever 13 by a loss motion connection 14. The ratchet lever 13 carries a pawl 15 for engaging and turning a toothed gear 16. The gear 16 carries a plurality of spaced contacts 17. These contacts 17 are adapted to contact with contact arms 18, the latter being connected with a circuit 19 to be controlled (see Figure IX).

The solenoid 11 is provided at the end opposite the end carrying the loss motion connection 14 with a sliding contact device 21. This contact device 21 is utilized for de-energizing the coil 11 when the plunger 12 reaches its full travel. A plunger return spring 22 is provided for biasing the plunger 12 toward the left as viewed in Figure I. The ratchet lever 13 is provided with a spring 23 for biasing it toward the left as viewed in Figure I.

The solenoid 11 is actuated by applying direct current to its coil which causes the plunger 12 to be pulled into the solenoid coil. The plunger operates to turn the toothed gear, which is mounted on a shaft 24, carried by the base 10, a fraction of a turn by means of the ratchet lever 13. When the plunger reaches its full travel, the electrical current in the solenoid is broken by the sliding contact device 21 actuated by the plunger 12. It will be clear from the drawings that a rod 25 associated with the right end of the plunger 12 will permit the sliding contact 21 to slide thereon and maintain contact with a cooperating contact 26 until such time as the sliding contact 21 reaches a stop member 27 carried by the member 25, when the stop member 27 will disengage the sliding contact 21 from the associated contact 26.

This operates to break the current in the solenoid 11 at which time the spring 22 will force the plunger 12 back to its initial position and at the same time allow the ratchet lever 13 to return to its initial position. At the end of the return of the plunger 12 the solenoid 11 is again energized by means of the above mentioned sliding contact 21.

It can now be understood that the electrical circuit 19 to be controlled is opened and closed by the spaced contact 17 carried by the toothed gear 16 when such contacts are brought into position to bridge the gap between the contact arms 18, as the toothed gear is rotated by the ratchet lever 13.

The time interval between the opening and closing of the circuit 19 is varied by the number of teeth engaged by the pawl 15 on the ratchet lever 13. The greater the number of teeth engaged by the ratchet lever, the shorter the time interval between the opening and closing of the circuit 19. The number of teeth engaged by the ratchet lever 13 is controlled by a stop member 31 carried by the ratchet lever 13 and adapted to cooperate with a cam member 32 carried by a sleeve or tube member 33 surrounding the shaft 24. For operating the cam 32 a pointer or indicator 34 is provided for turning the cam 32 by way of the member 33 to a position that will permit the pawl 15 of the ratchet lever 13 to engage one or more of the cooperating teeth of the gear 16. In the form shown, the gear is provided with six teeth between each of the spacings of the contacts 17 and the solenoid here provided is adapted to operate during a time interval of ⅕th of a second. Therefore, it can be seen that if the ratchet lever is set for engaging the gear 16 at a space of six teeth that the corresponding contact 17 will be brought successively into contact with the cooperating contacts arms 18 at an interval of ⅕th of a second, while if the cam member 32 and stop member 31 are positioned so that the pawl 15 will engage only one tooth of the gear 16 during each actuation of the solenoid 11 it will require a time element of six ⅕th seconds to bring the contacts 17 into successive contact with the cooperating contact arms 18.

For the purpose of predetermining the number of bombs to be dropped, teeth are omitted from the gear 16 along a space 35, which space is of a sufficient distance to preclude any further engagement of the pawl 15 with the gear teeth. Therefore, if it is desired to drop a predetermined number of bombs, the gear 16 is set by a handle member 36 carried by the outer end of the shaft 24 on which the gear 16 is mounted to correspond with the index 37 (see Figure IV).

For the purpose of preventing movement of the gear 16 during the turning of the pawl 15 to its initial position, pawls 38 are spring held into contact with adjacent teeth on the gear 16 for limiting the movement of the gear 16 to that allocated to the pawl 15.

The operation of the device can best be understood by referring to the wiring diagram shown in Figure V, wherein 43 indicates a source of power, such as a battery, 44 indicates in its entirety a time element control device as illustrated by Figures I to IV, inclusive, 19 the circuit to be controlled, the latter being associated with means to supply current successively to the several bomb racks indicated at 45.

The circuit 19 may be connected directly with bomb racks 45 by means of a double throw switch 46, or the circuit 19 may be connected to the bomb racks 45 by way of the time control device 44 by way of the switch 46. The circuit 19 is preferably provided with a master switch 47 for the conventional reason and in order to eliminate the human element from the actual operation of the interval between which the bombs are to be dropped a push button 48 is provided so that an operator may close the circuit 19 by pressing his finger on the button 48 after setting the control device 44 to drop a predetermined number of bombs at predetermined intervals. Should the operator's finger remain on the button 48 too long such delay would result only in continued operation of the solenoid 11, the blank space 35 on the toothed gear 16 operating to prevent the further dropping of bombs.

The circuit 19 is connected through the control device 44 and current is supplied to a bomb release mechanism indicated in its entirety by 49. It is to be understood that a bomb release mechanism 49 is supplied at each of the bomb racks 45.

This bomb release mechanism 49 includes a solenoid 51 which is energized by the current from circuit 19 by way of a switch mechanism 52 operated by the plunger 53 of the solenoid 51. Therefore, when the operator closes the circuit by pressing his finger on the button 48 the coil 51 of the bomb release mechanism 49 associated with bomb #1 operates to release the spring held bomb ejector 54, the latter operating to eject or drop the associated bomb (not shown) and at which time the bomb release mechanism 49 operated by the spring 55 assumes the position as shown in Figure VII, during which time the sliding contact 21 of the control device 44 has operated to break the circuit 19 and permits the spring 56 associated with the plunger 53 of the solenoid 51 to break the switch contact at 52 and make contact with the switch mechanism 57 so that when the solenoid 11 of the control mechanism 44 has operated to bring the next contact 17, carried by the gear 16, into contact relation with the cooperating contact arms 18, the current from the circuit 19 will be connected to the solenoid 51 of the bomb release mechanism 49 associated with bomb #2. This circuit is completed through the switch mechanism 57, switch mechanism 58, circuit 59 to the solenoid 51 of the bomb release mechanism associated with bomb #2.

The bomb ejector 54 has associated therewith and at its opposite end a contact 61, the latter being untilized for energizing a cooperating circuit 62 also fed from the battery 43 and having a light 63 connected therein so that when the bomb ejector 54 is released by the solenoid 51 the spring 55 operating the ejector 54 will cause the contact 61 to move from the cooperating associated switch mechanism 64 and into contact relation with the cooperating switch mechanism 65, the latter completing the cooperating circuits 59 and at the same time breaking the circuits 62 associated with the cooperating lights 63.

The operation of the device is identical for dropping each of the bombs and the operation takes place in succession upon bringing the cooperating contacts 17 into contact relation with the contact arms 18. The circuits associated with the indicating lights 63 as well as the circuits associated with each of the solenoids employed with the bomb release mechanisms are identical, each operating to transfer or properly connect current from the circuit 19 with the mechanism associated with the next bomb to be dropped.

The lights 63 are positioned for observation by the pilot or operator and keep him informed at all times of the number as well as locations of bombs already dropped or those available to be dropped.

While I have illustrated and described the present invention in connection with the time element control for dropping bombs, it will be apparent to those skilled in the art that the teachings of the present invention may readily be employed wherever intermittent opening and closing of an electrical circuit at predetermined intervals may be desired. Also it will now be obvious that such changes, substitutions, modifications, alterations, and omissions may be made in the detail arrangement and construction of the device without departing from the spirit and scope of the appended claims.

I claim:

1. A timing mechanism for a bomb device comprising a movable member, a series of projections on said member, a plurality of bomb releasing contact means carried by said member and arranged in series with respect to said projections, means engageable with said projections for intermittently moving said member, means for varying the degree of movement of said member through said projections during one movement of said member, and means for varying the number of intermittent movements of said member.

2. A timing mechanism for a bomb dropping device comprising a disc member, a plurality of electrical contacts mounted on said member, electrical leads for successively engaging said contacts, a plurality of teeth carried by said member, continual and uniformly reciprocating means, rachet means operated by said reciprocating means for engaging said teeth and thereby moving said member, means for varying the degree of movement of said rachet means and thereby the number of contacts touched by said leads upon one movement of said member, and means for varying the number of movements of said member in response to actuation of said ratchet means by said reciprocating member.

3. A timing mechanism for a bomb dropping device comprising a reciprocating member, a movable member, means connecting said members for moving said movable member in response to movements of said reciprocating member, means operable upon said connecting means for varying the degree of movement transmitted to said movable member from one movement of said reciprocating member, means for varying the number of movements of said movable member despite continual operation of said reciprocating member, and means mounted upon said movable member for operating bomb release mechanisms in response to movements of said movable member.

4. A timing mechanism as in claim 3, said movable member comprising a circular element having teeth extending partially of the circumference thereof, means mounting said element for rotation, and said connecting means comprising rachet means mounted to engage said teeth for uni-directional movement of said movable member.

5. A timing mechanism as in claim 3, said reciprocating member comprising a solenoid composed of a coil and a plunger, said connecting means comprising rachet means movable by said plunger and tooth means on said movable member engageable by said rachet means, means for energizing said coil to move said plunger in a direction to move said movable member, switch means for automatically de-energizing said coil at the end of movement of said plunger, and spring means for returning said plunger and said rachet means to starting position.

RALPH L. BELL.